US008692150B2

(12) United States Patent
Strock et al.

(10) Patent No.: US 8,692,150 B2

(45) Date of Patent: Apr. 8, 2014

(54) PROCESS FOR FORMING A CERAMIC ABRASIVE AIR SEAL WITH INCREASED STRAIN TOLERANCE

(75) Inventors: Christopher W. Strock, Kennebunk, ME (US); Robert D. Richard, Springvale, ME (US); Steven Lemay, Waterboro, ME (US)

(73) Assignee: United Technologies Corporation, Hartford, CT (US)

( * ) Notice: Subject to any disclaimer, the term of this patent is extended or adjusted under 35 U.S.C. 154(b) by 140 days.

(21) Appl. No.: 13/182,002

(22) Filed: Jul. 13, 2011

(65) Prior Publication Data

US 2013/0017338 A1 Jan. 17, 2013

(51) Int. Cl.
*B23K 10/00* (2006.01)

(52) U.S. Cl.
USPC ............ 219/121.47; 219/121.48; 219/121.59; 219/76.16; 427/446

(58) Field of Classification Search
CPC .................................... B23K 1/02; H05H 1/42
USPC ................. 219/121.47, 121.45, 76.15, 76.16, 219/121.48, 121.51; 427/446, 460
See application file for complete search history.

(56) References Cited

U.S. PATENT DOCUMENTS 4,235,943 A 11/1980 Hanna
4,696,865 A 9/1987 Richardson et al.
4,866,240 A 9/1989 Webber
5,047,612 A * 9/1991 Savkar et al. ............ 219/121.47
5,573,682 A 11/1996 Beason, Jr. et al.
5,858,470 A 1/1999 Bernecki et al.
6,215,091 B1 4/2001 Chung et al.
6,392,189 B1 5/2002 Delcea
6,657,152 B2 12/2003 Shimazu
6,706,993 B1 3/2004 Chancey et al.
6,963,045 B2 11/2005 Zapletal et al.
7,115,832 B1 10/2006 Blankenship et al.
7,582,846 B2 * 9/2009 Molz et al. ............... 219/121.47
8,067,711 B2 * 11/2011 Blankenship et al. ..... 219/121.4
2006/0289404 A1 * 12/2006 Hawley et al. ........... 219/121.47
2008/0185366 A1 * 8/2008 Suslov ..................... 219/121.47

FOREIGN PATENT DOCUMENTS

DE 2161453 A1 6/1972
EP 0532134 A1 3/1993
WO 2004028222 A1 4/2004
WO W02010112567 10/2010

OTHER PUBLICATIONS

European Search Report, mailed Nov. 16, 2012.

* cited by examiner

*Primary Examiner* — Mark Paschall
(74) *Attorney, Agent, or Firm* — Kinney & Lange, P.A.

(57) ABSTRACT

A plasma spray gun comprises a nozzle, an upstream powder injector, and a downstream powder injector. The upstream powder injector is disposed outside the nozzle and axially adjacent a nozzle outlet. The downstream powder injector is disposed axially downstream of the first upstream powder injector. The downstream powder injector is operative in a first coating mode, and the upstream powder injector is operative in a second coating mode.

17 Claims, 5 Drawing Sheets

PROCESS FOR FORMING A CERAMIC ABRASIVE AIR SEAL WITH INCREASED STRAIN TOLERANCE

BACKGROUND

The invention relates generally to methods and apparatus for coating articles, and more specifically to methods and apparatus for coating articles with oxide ceramic.

Oxide ceramic coatings have been traditionally applied using a plasma spray process. Oxide ceramic powder is injected into and melted by a high-temperature plasma plume or flame and the molten droplets are directed onto a metallic substrate or intermediate bond coat. Many applications only require a generic coating of a minimum or maximum thickness to protect the underlying substrate. For such applications, a plasma spray process is generally appropriate. For some applications which require additional strain tolerance such as ceramic rotor coatings that provide a sealing surface for cantilevered compressor vanes, an alternative process has been used in order to impart the special coating properties required for the application. That alternative process is combustion flame spray. Combustion flame spray operates at a reduced temperature compared to a plasma plume. The flame spray plume is just hot enough to partially melt the ceramic and provide the desired low level of densification and bonding within the coating. However, the combustion flame spray process is not particularly appropriate for tight control and repeatability, particularly when approaching the limits of the process. Thus, for applications like aerospace components, the oxide ceramic coatings cannot be applied consistently or uniformly using combustion flame spray.

Other applications require very fine control of the application process to achieve a satisfactory microstructure and physical properties on the component. Though plasma spray offers greater control and repeatability for application of oxide ceramic coatings, the plasma temperatures far exceed those required for certain oxide powders, such as alumina. Applying those lower temperature powders using a traditional plasma spray process results in too much heat flux to the powder and can negatively impact the desired microstructure, and thus the short- and long-term performance of the coated part.

SUMMARY

A plasma spray gun comprises a nozzle, an upstream powder injector, and a downstream powder injector. The upstream powder injector is disposed outside the nozzle and axially adjacent a nozzle outlet. The downstream powder injector is disposed axially downstream of the first upstream powder injector. The downstream powder injector is operative in a first coating mode, and the upstream powder injector is operative in a second coating mode.

A face plate for a plasma spray gun comprises a central orifice, an upstream powder injector and a downstream powder injector. The upstream powder injector is disposed axially adjacent the nozzle chamber outlet. The downstream powder injector is disposed axially downstream of the first powder injector. The downstream powder injector is operative in the first coating mode; and the upstream powder injector is operative in the second coating mode.

A method for coating a surface of an article is disclosed. A gas mixture is ionized in a nozzle chamber of a plasma spray apparatus. The ionized gas mixture is discharged as a plume directed toward the surface to be coated. A first coating powder is injected into a heated gas section of the ionized gas plume between the plasma spray apparatus and the surface to be coated so as to only partially melt the first powder. The partially melted powder is solidified on the surface to form the coating.

DETAILED DESCRIPTION

Figure 1:
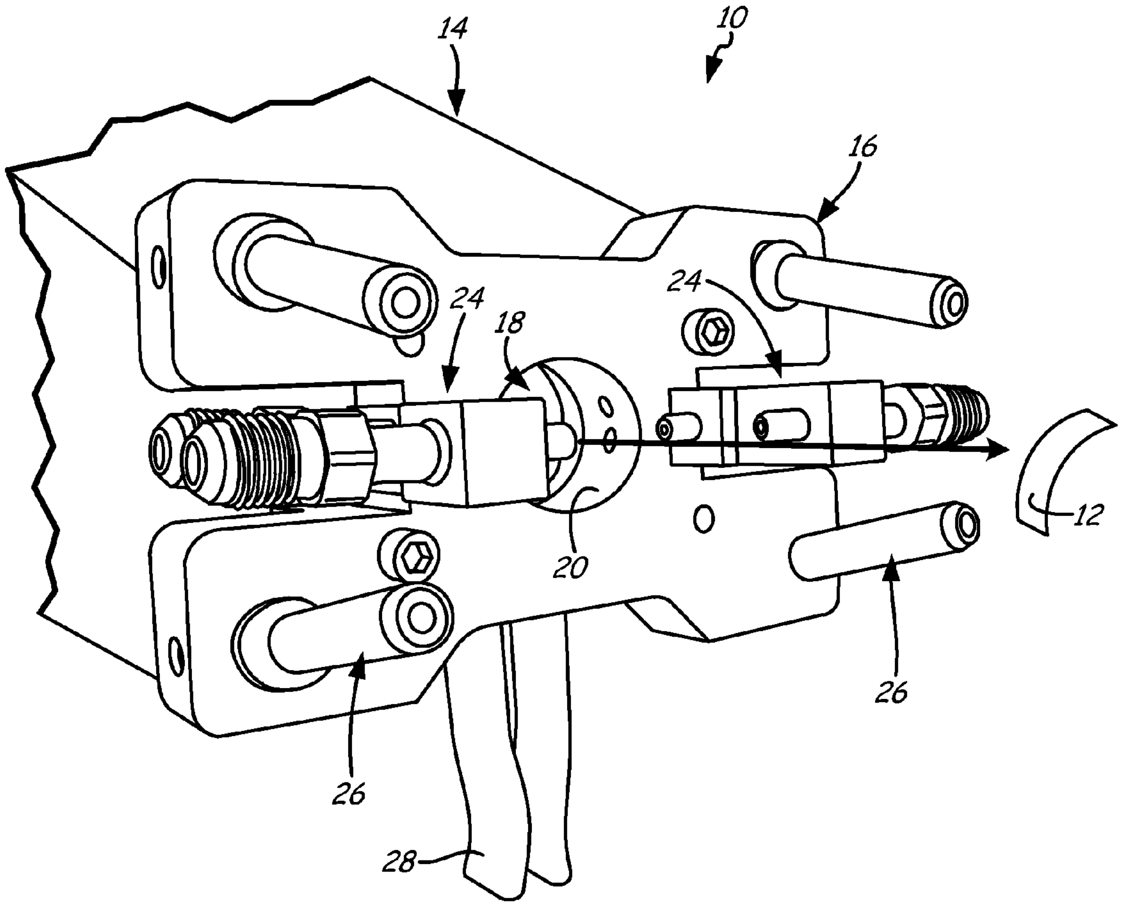
FIG. 1 schematically depicts an air plasma spray nozzle assembly.

FIG. 1 shows air plasma spray gun 10, target part 12, nozzle 14, selectable face plate 16, nozzle outlet 18, orifice 20, powder injectors 24, air jets 26, and mount 28.

FIG. 1 is a schematic of air plasma spray gun 10 configured to apply various types of coatings, including oxide ceramics, to target part 12. Removably secured to the front of nozzle 14 is face plate 16, The nozzle chamber (shown in FIG. 2) is disposed within nozzle 14 and includes outlet 18 axially aligned with nozzle orifice 20 on face plate 16. As described below, inlet gas is ionized into a plasma in the nozzle chamber and emits ionized gas plume 22 out of outlet 18 and orifice 20 toward target part 12. Powder injection ports 24 located axially downstream from and radially around orifice 20 inject one or more subject powders into plume 22 (shown in FIGS. 2A and 2B and omitted from FIG. 1 for clarity). Depending on the injection location, heat flux to the powder varies and either partially or completely melts the powder(s). Plume 22 carries the molten powder to at least one surface of target part 12 where it solidifies into a coating. The powder is typically an oxide ceramic, but other coating materials can be used as described in more detail below.

Air jets 26 are directed generally parallel to and slightly radially toward ionized gas plume 22 to control the part temperature and to remove particles that have not adhered to the part. In this example, spray gun 10 is removably secured to a rigid support structure (not shown) via mount 28. Mount 28 can be any suitable structure including a pinch clamp, a screw clamp, or other type of means for fixing gun 10 into place. In alternative embodiments, such as portable handheld microspray guns, mount 28 can be replaced by a handle and trigger arrangement, or other suitable means for controlling and fixing the direction and orientation of spray gun 10 relative to target part 12.

Plasma spray works at higher temperatures and provides more control and repeatable results as compared to conventional combustion flame spray coating machines. Many oxide ceramic coatings have high melting temperatures, and approach or exceed the capabilities of combustion flame spray machines. Thus, when using many ceramic powders, slight variations in the flame spray process such as changes in the ambient conditions, fuel pressure, component wear, etc. can all result in unsatisfactory properties of the finished product. Since the microstructure often defines key properties of the finished product including strain tolerance, bonding, etc., heat flux, temperatures, and material flow rates must be finely maintained and controlled.

Plasma spray processes traditionally offer a much higher heat flux and control as compared to combustion flame spray. Conventionally, the powder ports are axially adjacent to the nozzle to maximize heat flux to the powder. However, there is a substantial operational gap between conventional flame spray and conventional plasma spray. For many applications, combustion flame spray provides insufficient heat flux and process control, while plasma spray machines transfer too much heat flux to the powder, resulting in brittle, excessively hard and dense coatings.

As will be seen below, plasma spray gun 10 is operable in multiple coating modes to control the heat flux provided to the selected powder thereby controlling the density, hardness, and resilience of the coating based on the desired properties and the selected powder. In certain embodiments, also described below, the coating modes can be selected by activating different powder injectors 24. In certain of those embodiments, the selectable powder injectors are disposed on face plate 16.

Figures 2A, 2B:
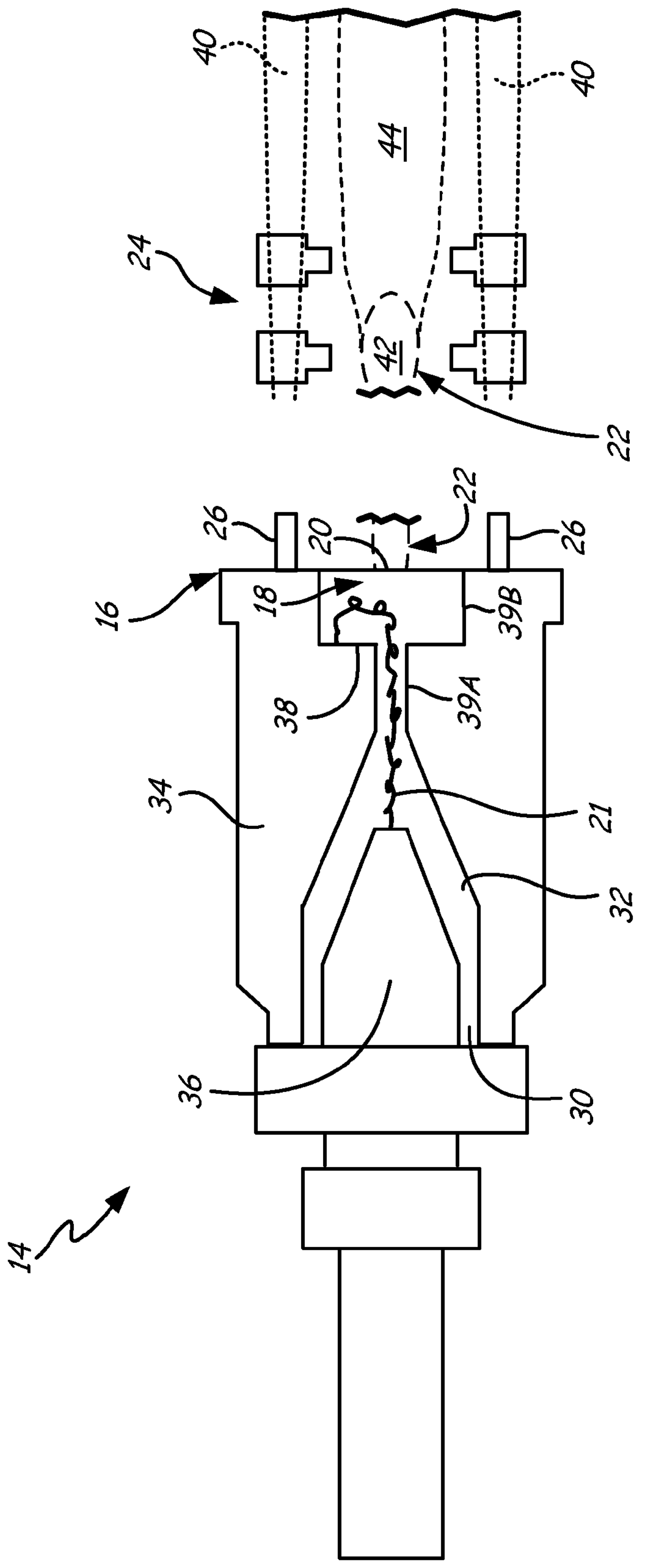
FIG. 2A shows an axial cross-section of the plasma spray assembly including the nozzle and selectable face plate.
FIG. 2B shows different portions of the ionized gas plume exiting the nozzle.

FIG. 2A shows a top view of an axial cross-section of selectable plasma spray gun 10 with nozzle 14, face plate 16, nozzle orifice 20, electric arc 21, plume 22, powder injectors 24, air jets 26, gas inlet 30, nozzle chamber 32, anode 34, cathode 36, anode step 38, first radial surface 39A, and second radial surface 39B.

Electric arc 21 is generated through gases entering inlet 30 into nozzle chamber 32. In this example, chamber 32 is defined by anode 34 annularly surrounding cathode 36. Electrical arc 21 generated between anode 34 and cathode 36 temporarily ionizes the inlet gas into a plasma, which then proceeds downstream and exits as plume 22 from outlet 18. In an air plasma spray (APS) gun, the inlet gas can be any atmospheric gas like hydrogen, nitrogen, argon, neon, or mixtures thereof. In the APS gun, a portion of gas entering generally tangentially from inlet 30 tends to sweep the conductive ionized gas downstream where arc 21 connects to anode 34. The ionized gas flows downstream and mixes with the surrounding gas, raising the gas temperature and carrying the resulting ionized plume toward outlet 18.

Here, arc 21 attaches to anode 34 at step 38. Step 38 is disposed between first radial surface 39A and second radial surface 39B. Second radial surface 39B has a second diameter larger than a first diameter of first radial surface 39A. This geometry creates turbulent flow of the inlet gas and forces attachment of arc 21 around the stepped nozzle chamber. In contrast, a standard anode/nozzle with a tapered exit surface tends to result in an inconsistent arc that is fixed in a relatively small region of the chamber. Here, stabilizing arc attachment and the resultant extended arc length helps maintain the correct heat flux and profile of plume 22 by more evenly distributing the energy through gas entering at inlet 30. In this example, to further stabilize and control arc 21, anode 34 is manufactured from copper with a tungsten lined surface inside nozzle chamber while cathode 36 is tungsten. The tungsten lined surfaces include step 38 and radial surfaces 39A, 39B. However other combinations and geometries of anode 34 and cathode 36 can be selected to control ionization of the inlet gas based on the desired energy and turbulence of plume 22.

FIG. 2B shows ionized gas plume 22, air streams 40, plasma decay region 42, and heated gas region 44. The resultant plume 22 of heated particles and gas interacts with the part surface where particles deposit and the gas plume transfers heat to part 12 (shown in FIG. 1). Air jets 26 (shown in FIG. 2A) are used to extract excess heat from the part and to remove poorly adhered particles from the coating surface as it builds. Jets 26 (shown in FIG. 2A) are generally arranged around plate 16 and direct air streams 40 generally downstream and slightly toward the deposition path on the part surface. The deposition path (not shown) is the general axial position on the rotating part 12 (shown in FIG. 1) where a given location on the part passes under the deposition spot a number of times as the torch is slowly traversed across the rotating part. This path is chosen based on the geometry and required uniformity of the coating.

Ionized gas plume 22 maintains a high amount of energy along its length but quickly degrades back into a traditional gas as it moves downstream from orifice 20 (shown in FIG. 2A). Proximate orifice 20, plume 22 is characterized as plasma decay region 42 where much of the recombination of molecules and their electrons takes place. Once the plasma has substantially reformed into a heated gas, the region downstream of decay region 42 can be characterized as heated gas region 44. Region 44 still retains significant heat in plume 22, often on the order of about 8,000° F. (about 4,400° C.) to about 10,000° F. (about 5,500° C.) or more, but can no longer be described as fully a plasma because the ionized gas has substantially recombined into a superheated gas by the time it reaches the end of plasma decay region 42.

After emission, plume 22 is injected with powder via injectors 24. In certain embodiments, face plate 16 is selectable between injecting powder into one or both of plasma decay region 42 and heated gas region 44. Depending on the injection location, heat from either region 42 or 44 heats and at least partially melts the ceramic powder. For some oxide ceramic or other coatings with high melting temperatures, powder is introduced into plasma decay region 42 to fully melt the powder and to limit the amount of powder that remains in solid form. However, other ceramic powders have a lower melting point or otherwise may require less melting and superheating to provide the appropriate coating characteristics on target part 12 (shown in FIG. 1). Thus some powders are introduced further downstream into heated gas region 44. As will be seen in the example face plate 16 shown in FIGS. 3A and 3B, upstream and downstream powder injectors 24 can be arranged axially to introduce powder into one or both regions 42, 44.

Figure 3A:
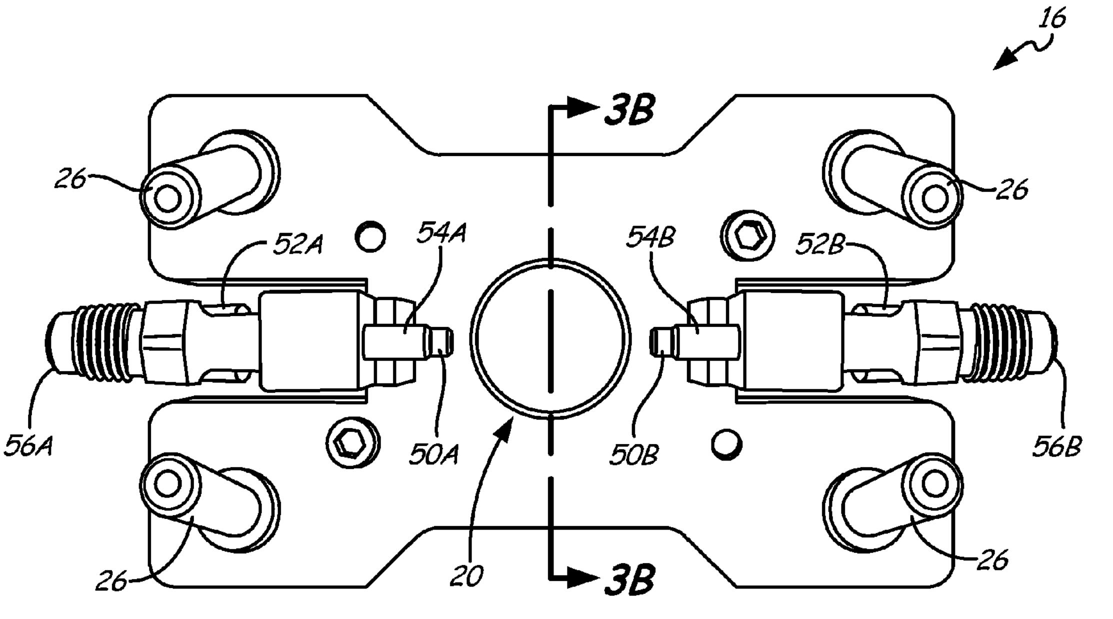
FIG. 3A shows a front view of the selectable face plate.
Figure 3B:
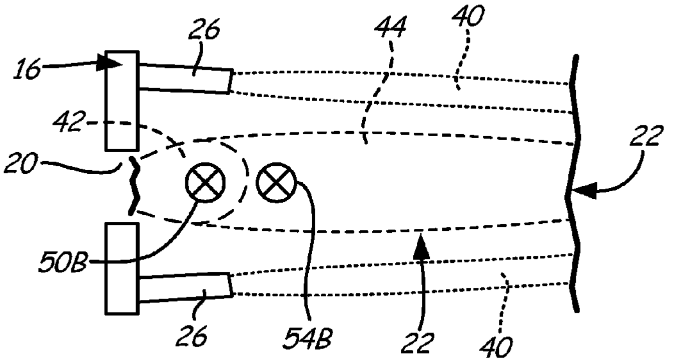
FIG. 3B is an axial cross section of the selectable face plate and showing plasma decay regions.

FIG. 3A shows a front view of selectable face plate 16, plasma nozzle orifice 20, powder injectors 24, air jets 26, upstream powder injection ports 50A, 50B, upstream powder inlets 52A, 52B, downstream powder injection ports 54A, 54B, and downstream powder inlets 56A, 56B. FIG. 3B is a cross-section of face plate 16 taken along line 3B of FIG. 3A and additionally shows plasma decay region 42 and downstream heated gas region 44.

As described above, selectable face plate 16 can include powder injectors directed at multiple axial locations, and those injectors can be selected for the particular coating application. In this example, face plate 16 includes an upstream powder injector with upstream injection ports 50A, 50B axially adjacent to nozzle outlet 18 and face plate orifice 20 (shown in FIGS. 1 and 2A). Here, face plate 16 also includes a downstream powder injector with downstream injection ports 54A, 54B axially downstream of ports 50A, 50B. In this example, each injector has two diametrically opposed injection ports. Upstream injection ports 50A, 50B are disposed diametrically opposite each other on plate 16 such that they are aligned with plasma decay region 42 (shown in FIG. 3B).

Downstream ports 54A, 54B are generally arranged to inject powder proximate outlet region 44 (shown in FIG. 3B).

Ports 50A, 50B are provided with powder entering via hoses or other conveyances (not shown for clarity) connected to respective upstream inlets 52A, 52B, while powder injected downstream enters ports 54A, 54B via respective downstream inputs 56A, 56B, also through hoses or other similar conveyances (not shown for clarity). These conveyances can be arranged with valves or other selecting means (not shown) to utilize either upstream ports 50A, 50B or downstream ports 54A, 54B. In this particular example, downstream ports 54A, 54B are about 0.75 inch (18 mm) downstream of upstream ports 50A, 50B and a total of about 1.0 inches (25 mm) from nozzle orifice 20. However, these distances will vary based on the energy of the ionized gas plume as well as the properties and flow rates of powder through the respective ports 50, 54.

Here, at least one of downstream ports 54A, 54B are active in a first coating mode while at least one of upstream ports 50A, 50B are active in a second coating mode. In this example, the first coating mode is characterized by only partially melting the injected powder to reduce density and hardness of the coating, while the second coating mode is characterized by fully melting the powder, resulting in a harder, more brittle coating. It will be apparent that neither the upstream powder injector nor the downstream powder injector necessarily includes two ports each. In certain embodiments, one or more of the axially disposed powder injectors each comprises at least one injection port. In certain of those embodiments, one or more powder injectors each comprises a plurality of ports circumferentially distributed around outlet 18 and orifice 20 (shown in FIGS. 1 and 2A). For example, in the event three ports are provided in the downstream set rather than two, the downstream ports can be separated roughly every 120° around the plume. It will also be apparent that when either the upstream injector or the downstream injector is operative for a particular coating mode, not all ports at that injector are necessarily active for a particular application.

Certain manufacturing requirements may call for the same coating material to have different properties on the same target piece. For example, the same coating may be used but will require a harder, denser application in a second region of the target piece. Thus, to apply the denser coating, the user would utilize at least one of upstream ports 50A, 50B in a second coating mode, while the less-dense coating would be applied in a first coating mode utilizing at least one of downstream ports 54A, 54B.

In other related cases, the target part may require one lower temperature coating to be applied at one higher temperature, with a second coating to be elsewhere on the piece. It may be desired to apply the coating at a lower temperature than is possible using a traditional plasma spray gun where the powder is completely melted. One example of such a coating material is alumina ($Al_2O_3$). Flexibility is thus provided with one or more sets of powder injectors disposed at multiple axial injection locations along the emitted plasma plume.

As described previously, for certain applications, it is useful to inject powder into heated gas plume 44 (corresponding to downstream ports 54A, 54B) rather than upstream plasma decay region 42 adjacent to the nozzle outlet. In certain alternative embodiments where downstream injection is predominantly or exclusively practiced due to particular coating requirements, upstream ports 50A, 50B can be omitted. In certain other embodiments, there are three or more powder injectors 24 (shown in FIG. 2B) arranged axially in a manner similar to the upstream and downstream ports shown in FIGS. 3A and 3B.

As also seen in FIG. 3B, upstream port 50A and downstream port 54A are arranged to inject powder normal to the direction of plume 22 (i.e., out of the page). However, to further add flexibility to plate 16, upstream ports 50A, 50B and/or downstream ports 54A, 54B can be configured in an off-normal orientation such that the powder is injected upstream or downstream of the position normal to plume 22.

In previous plasma spray guns, the powder is injected into the plasma plume immediately downstream of the plasma nozzle outlet (roughly proximate the axial location of ports 50A, 50B). For most applications, this provides more than enough heat from the plasma plume to melt the injected powder, melting as much of the coating material as possible. However, maximum heating of the ceramic is not always the best outcome for the final solidified coating. Certain parts or even certain locations on the same part can require robust interparticle bonding while other parts benefit from weaker bonding. By limiting powder injection to one axial location immediately adjacent the nozzle outlet, many ceramics solidify with substantial bonding and thus a more rigid and brittle structure. This is appropriate for some applications, but other parts require a more forgiving structure. Other parts need coatings with reduced hardness, improved strain tolerance, and machinability to achieve tight dimensional tolerances suitable for severe service like aerospace components.

Using downstream ports 54A, 54B results in reduced heat flux to the injected powder as compared to upstream ports 50A, 50B. The exact axial location, number, and orientation of ports 54A, 54B is chosen to provide sufficient heat to vaporize many lower temperature oxide powders like alumina, without burdening the powder with excessive heating that will affect bonding and densification of the powder as it deposits. To further facilitate appropriate interparticle bonding, temperature of target part 12 can also be controlled as described in the example below.

Since face plate 16 offers selectable injection locations along the axial discharge plume 22, it can be used in both traditional and modified APS regimes. With downstream injection locations and the resulting reduced heat flux, there is an increased likelihood of a substantial amount of unmelted powder being present around orifice 20. This unmelted powder can be removed from the area by air provided by port blow-off structures (not shown for clarity) proximate injection ports 50 and/or 54. One example of a suitable arrangement of ports blow-off structures is described in commonly assigned U.S. Pat. No. 7,644,872, which is herein incorporated by reference in its entirety.

Selectable face plate 16 was initially created for an APS process but are believed to be equally applicable to other plasma spray processes as well to provide reduced heat flux. These other plasma spray machines can include high velocity plasma spray (HVPS), and low pressure plasma spray (LPPS). In addition, while the above figures show injection ports 50A, 50B, 54A, and 54B secured to face plate 16, for convenience on other plasma spray machines, the ports can be secured to any appropriate structure(s) downstream of outlet 18.

Figure 4A:
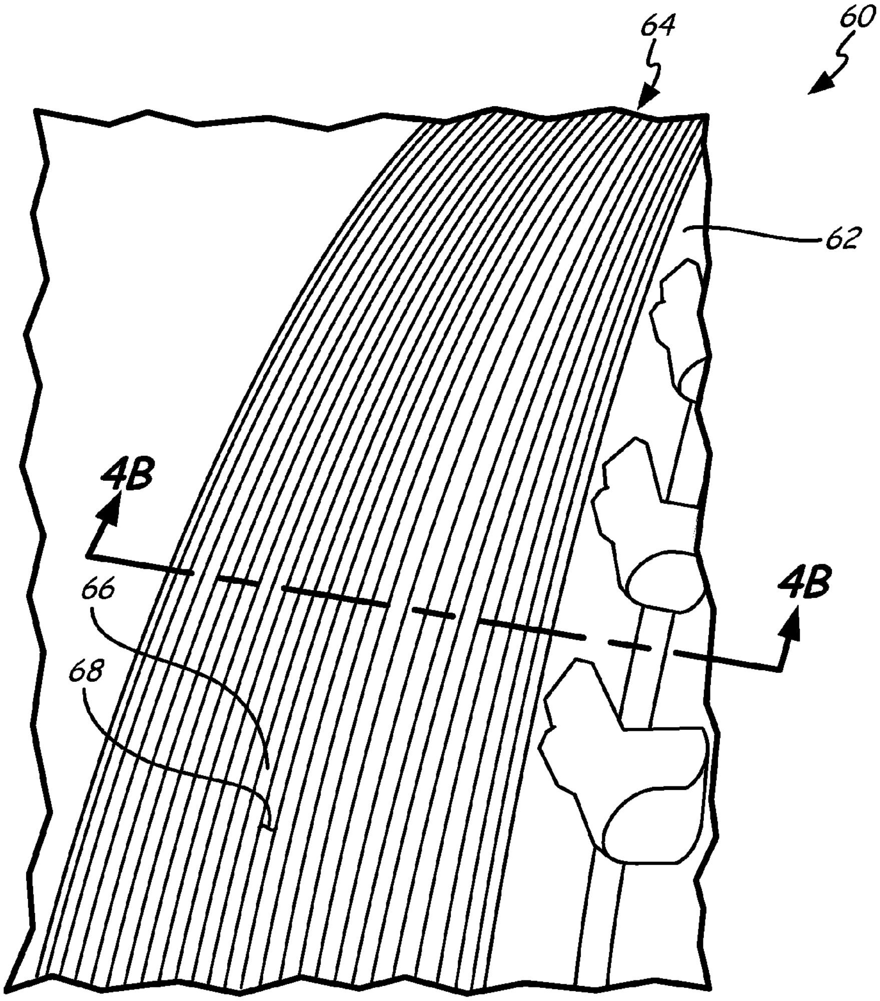
FIG. 4A shows an example rotor seal land with an alumina coating applied according to the described process.
Figure 4B:
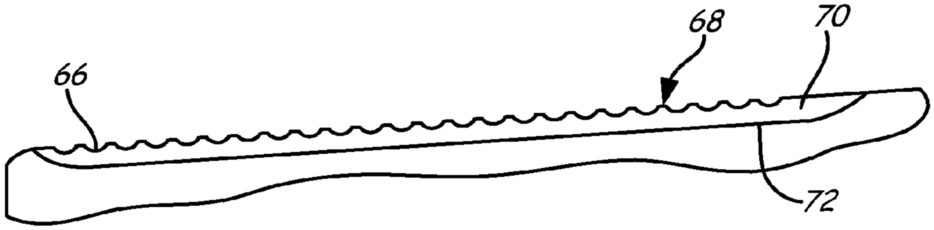
FIG. 4B shows a magnified cross-section of the coated rotor seal land in FIG. 4A.

FIG. 4A shows a portion of compressor rotor disc 60, disc rim 62, rotor seal land 64, grooves 66, and surface 68, and. FIG. 4B is a magnified cross-section of coated land surface 68 taken across line 4B of FIG. 4A and additionally includes coating 70 and recess 72.

FIGS. 4A and 4B show an example application of the above-described process and apparatus. In this example, compressor rotor disc 60 is one of several discs in serial flow communication with one another in the high pressure compressor section of a gas turbine engine (not shown). Here, disc 60 is a titanium alloy such as Ti-6Al-4. A plurality of rotor blades (not shown) are ordinarily secured around rim 62 adjacent to rotor seal land 64. In one example, Land 64 forms the rotor portion of a labyrinth seal with grooves 66 formed in coated surface 68. Seal land 64 in this example absorbs rubbing and contact forces by abrasively interacting with tips of cantilevered stator vanes (not shown). Coated land surface 68 is coated using the above described process and apparatus. FIG. 4B shows recess 72 in land 64 where coating 70 is applied to provide abradable surface 68.

EXAMPLE

The following describes testing and examples of the above-described coating process using the modified plasma spray gun and face plate.

A plasma gun similar to that shown in FIGS. 1-3 above was tested within a range of parameters. The gun included a nozzle with a central tungsten cathode and an outer stepped tungsten lined copper anode. The plasma was generated using a mixture of $N_2$ and $H_2$ inlet gas with flow rate of $N_2$ ranging from about 77 to about 94 standard cubic feet per minute (scfm), while the $H_2$ inlet rate ranged between about 13.5 to about 16.5 scfm. The gas mixtures were ionized into plasma during different runs with electric arcs having power ratings between about 25 kW and about 29 kW. Alumina powder (−325 mesh, 99.9% pure) was injected at a rate of 5 pounds (2.3 kg) per hour perpendicular the outlet plume at a downstream radially opposed pair of injection ports positioned approximately 1.0 inches axially removed from the nozzle outlet. The stand-off distance (between the nozzle outlet and the surface to be coated on the target part) during different experiments was fixed in a range between approximately 4.5 inches (~115 mm) and approximately 6.0 inches (~150 mm). The target part was maintained with a closed-loop temperature control at several different temperatures. The lowest temperature tested was about 725° F. (~385° C.) and the highest at about 875° F. (~470° C.) during the spray.

Figure 5A:
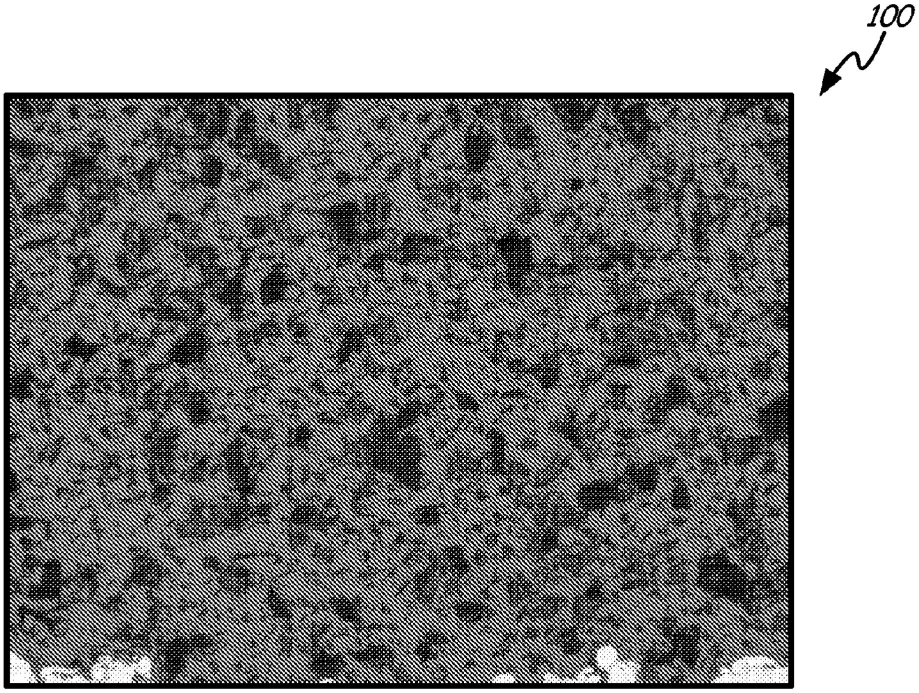
FIG. 5A is a micrograph of an alumina coating magnified 100 times.
Figure 5B:
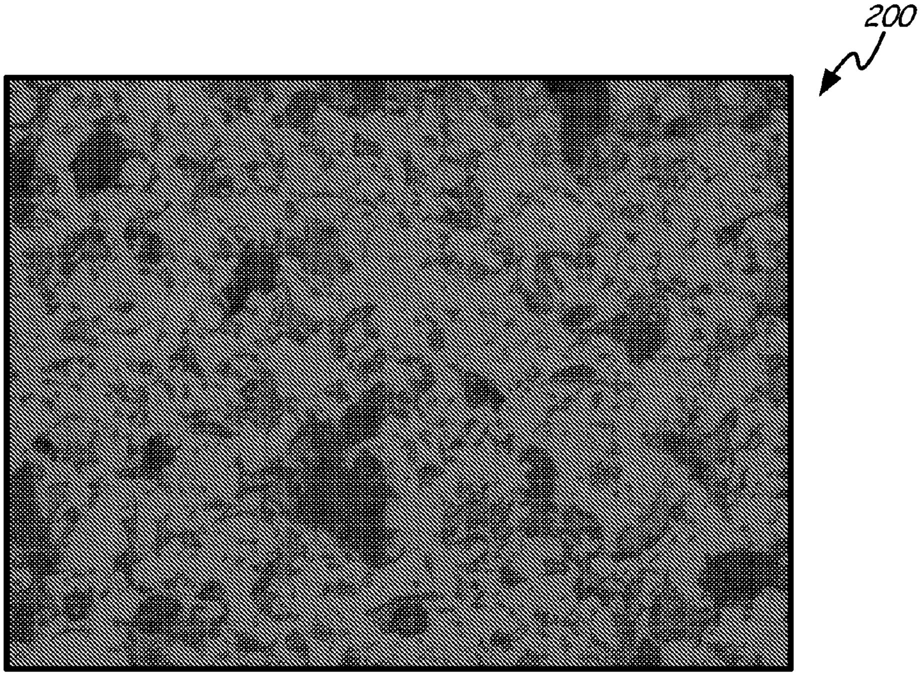
FIG. 5B is a micrograph of an alumina coating magnified 200 times.

FIGS. 5A and 5B show respective micrographs 100, 200 of an alumina coated sample using the modified selectable APS nozzle. FIG. 5A shows the coating at 100× magnification while FIG. 5B is at 200×. The plasma was generated using a mixture of $N_2$ and $H_2$ inlet gas with respective flow rates of 94 and 17 scfm. The inlet gas mixture was ionized with a 27 kW electric arc as it passed between the anode and cathode. Alumina powder (−325 mesh, 99.9% pure) was injected at a rate of 5 pounds (2.3 kg) per hour into the outlet plume at a diametrically opposed pair of injection ports positioned approximately 1.0 inches axially downstream from the nozzle outlet and about 0.75 inch (18 mm) downstream of the first set of injection ports. The nozzle outlet was positioned approximately 5.25 inches (133 mm) from the surface to be coated on the target part. The target part was maintained at a temperature of 800° F. +/−10° F. (427° C.+/−5.5° C.) during the spray and was allowed to air cool for one hour once the coating had initially solidified. The example process resulted in a coating having a relatively uniform thickness of about 20.0 mils (0.5 mm) with favorable hardness and strain tolerance based on controlled interparticle bonding.

The above process, apparatus, and example have been described relative to applying oxide ceramic coatings to a metal substrate. However, it will be appreciated that the example embodiments can be readily adapted for other coatings and substrates. For example, upstream ports may be used to apply thermal barrier coatings as well as bond coatings. In addition, the substrate can alternatively be a ceramic-based part instead of a traditional metal alloy.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A plasma spray gun operable in a first coating mode and a second coating mode, the plasma spray gun comprising:
- a nozzle including a cathode portion aligned generally along a longitudinal axis of the nozzle, the cathode portion surrounded by an anode portion disposed annularly around the cathode portion, the volume between the cathode portion and the anode portion defining a nozzle chamber having an inlet and an outlet;
- an upstream powder injector disposed external to the nozzle, the upstream powder injector secured axially adjacent and proximate to the nozzle chamber outlet;
- a downstream powder injector disposed external to the nozzle, the downstream powder injector secured axially downstream of the upstream powder injector and distal from the nozzle chamber outlet; and
- a powder selection mechanism adapted to operate at least one of the upstream powder injector and the downstream powder injector;
- wherein the downstream powder injector is operative in the first coating mode; and the upstream powder injector is operative in the second coating mode.

2. The plasma spray gun of claim 1, wherein the plasma spray gun is selectable between the first coating mode and the second coating mode.

3. The plasma spray gun of claim 1, wherein the upstream powder injector and the downstream powder injector are affixed to a face plate removably secured to the nozzle proximate the nozzle chamber outlet.

4. The plasma spray gun of claim 1, wherein the upstream powder injector comprises at least one upstream powder injection port.

5. The plasma spray gun of claim 4, wherein the upstream powder injector comprises a plurality of upstream powder injection ports circumferentially distributed around the nozzle chamber outlet.

6. The plasma spray gun of claim 1, wherein the downstream powder injector comprises at least one downstream powder injection port.

7. The plasma spray gun of claim 6, wherein the downstream powder injector comprises a plurality of downstream powder injection ports circumferentially distributed around the nozzle chamber outlet.

8. The plasma spray gun of claim 1, further comprising a plurality of air jets disposed peripherally around the nozzle outlet and configured generally parallel to the longitudinal axis of the nozzle.

9. The plasma spray gun of claim 1, wherein the anode portion includes a first radial surface disposed proximate the cathode portion, and a second radial surface disposed proximate the nozzle chamber outlet, the second radial surface having a larger circumference than a circumference of the first radial surface.

10. The plasma spray gun of claim 9, wherein the anode portion comprises copper.

11. The plasma spray gun of claim 10, wherein the first and second radial surfaces are coated with tungsten.

12. The plasma spray gun of claim 1, wherein the powder selection mechanism comprises at least one control valve in communication with the upstream powder injector, and the downstream powder injector.

13. A selectable face plate for a plasma spray gun, the face plate selectable between at least a first coating mode and a second coating mode, the face plate comprising:

a central orifice for axially aligning the face plate with a nozzle chamber outlet of the plasma spray gun;

an upstream powder injector secured on a first side of the face plate axially adjacent and proximate to the central orifice;

a downstream powder injector secured on the first side of the face plate axially downstream of the upstream powder injector and distal from the central orifice;

a powder selection mechanism adapted to operate at least one of the upstream powder injector and the downstream powder injector;

wherein the downstream powder injector is operative in the first coating mode; and the upstream powder injector is operative in the second coating mode.

14. The face plate of claim 13, wherein the upstream powder injector comprises a plurality of upstream powder injection ports circumferentially distributed around the central orifice.

15. The face plate of claim 13, wherein the downstream powder injector comprises a plurality of downstream powder injection ports circumferentially distributed around the central orifice.

16. The face plate of claim 13, further comprising a plurality of air jets disposed peripherally around the central orifice and directed generally parallel to the longitudinal axis of the nozzle.

17. The face plate of claim 13, wherein the powder selection mechanism comprises at least one control valve in communication with the upstream powder injector, and the downstream powder injector.

* * * * *